(12) United States Patent
Craske et al.

(10) Patent No.: US 8,756,377 B2
(45) Date of Patent: Jun. 17, 2014

(54) AREA AND POWER EFFICIENT DATA COHERENCY MAINTENANCE

(75) Inventors: Simon John Craske, Cambridge (GB); Antony John Penton, Cambridge (GB); Loic Pierron, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 1064 days.

(21) Appl. No.: 12/656,538

(22) Filed: Feb. 2, 2010

(65) Prior Publication Data

US 2011/0191543 A1    Aug. 4, 2011

(51) Int. Cl.
*G06F 13/00* (2006.01)
*G06F 13/28* (2006.01)

(52) U.S. Cl.
USPC ........... 711/141; 711/142; 711/143; 711/146; 711/E12.026

(58) Field of Classification Search
None
See application file for complete search history.

(56) References Cited

U.S. PATENT DOCUMENTS

| 5,860,111 | A | * | 1/1999 | Martinez et al. | 711/143 |
| 6,108,721 | A | * | 8/2000 | Bryg et al. | 710/22 |
| 6,345,320 | B1 | * | 2/2002 | Kawamata et al. | 710/22 |

* cited by examiner

*Primary Examiner* — Eric S Cardwell
(74) *Attorney, Agent, or Firm* — Nixon & Vanderhye P.C.

(57) ABSTRACT

An apparatus for storing data that is being processed is disclosed. The apparatus comprises: a cache associated with a processor and for storing a local copy of data items stored in a memory for use by the processor, monitoring circuitry associated with the cache for monitoring write transaction requests to the memory initiated by a further device, the further device being configured not to store data in the cache. The monitoring circuitry is responsive to detecting a write transaction request to write a data item, a local copy of which is stored in the cache, to block a write acknowledge signal transmitted from the memory to the further device indicating the write has completed and to invalidate the stored local copy in the cache and on completion of the invalidation to send the write acknowledge signal to the further device.

22 Claims, 5 Drawing Sheets

AREA AND POWER EFFICIENT DATA COHERENCY MAINTENANCE

BACKGROUND OF THE INVENTION

1. Field of the Invention

The field of the invention relates to data processing and in particular to maintaining memory coherency in a data processing apparatus having multiple masters, at least one local cache and a memory.

2. Description of the Prior Art

FIG. 1 shows schematically a very simple system where coherency problems can arise. This system has a DMA 5 (direct memory access device) that accesses a memory 25 via a bus 20. There is also a processor CPU 10 that has a local cache and that also accesses the memory 25. In this example the cache of the CPU 10 is configured as a write-through cache so that data that the CPU 10 writes to the memory is written to the cache as well. This allows the CPU 10 to access this data more quickly later. However, as the DMA 5 is also accessing the memory 25 it may overwrite a data item stored in the memory that is also stored in the cache of the CPU. This would result in the CPU 10 storing an out of date value for that data item which if not corrected could result in errors in the CPU's processing. To protect against this there is a monitoring circuit 12 provided that snoops writes sent from the DMA 5 on the bus 20 and in response to detecting a write to an address stored in the cache of CPU 10 it invalidates the line in the cache storing this value. This means that a future access to the data item by the CPU 10 will miss in the cache and the CPU will access the memory 25 and retrieve the correct value. A problem with this system is that snooping of the bus and invalidation of the line in the cache takes time and in order to avoid errors it must happen quickly enough to keep up with the DMA writes, otherwise if an interrupt occurs between the DMA 5 updating a value of a data item in the memory and the corresponding cache line being invalidated an incorrect value could be stored in the CPU.

One way of addressing this problem is to put "back pressure" on the DMA so that it is stalled until the CPU has completed its work on the cache. FIG. 2 shows an example of a system having a write-back cache where the CPU 30 writes a data value to its cache and marks it as dirty and updates the memory and then marks the value as clean. This increases the speed of the writes but makes the coherency scheme more complex. In such a system, the most up to date value of a data item may be stored in the cache and not in the memory and thus, the snoop unit blocks any DMA writes if it detects the value to be stored in the CPU until the cache has been invalidated and cleaned if required. This maintains coherency but introduces significant delays as the DMA writes are stalled until the CPU has done the required work on its cache.

It would be desirable to be able to maintain cache coherency without unduly increasing processing delays.

SUMMARY OF THE INVENTION

A first aspect of the present invention provides an apparatus for storing data being processed comprising: a cache associated with at least one device and for storing a local copy of data items stored in a memory for use by said at least one device; monitoring circuitry associated with said cache for monitoring write transaction requests to said memory initiated by at least one further device, said at least one further device being configured not to store data in said cache, said monitoring circuitry being responsive to detecting a write transaction request to write a data item, a local copy of which is stored in said cache, to block a write acknowledge signal transmitted from said memory to said at least one further device indicating said write has completed and to invalidate said stored local copy in said cache and on completion of said invalidation to send said write acknowledge signal to said at least one further device.

The present invention recognises the competing problems associated with cache coherency operations. These operations need to keep pace with data writes if errors are to be avoided, however, doing this by delaying the writes, increase delays in the system. The present invention addresses these competing problems by rather than blocking a write request until coherency operations have been performed, it rather allows it to proceed and the actual write to be performed but it blocks it completing by blocking the transmission of the write acknowledge signal. When the write acknowledge signal is detected by the monitoring circuit it is blocked and invalidation of the corresponding cache entry is performed. Thus, the write acknowledge signal is blocked until the entry invalidation is completed whereupon the write acknowledge signal is unblocked and allowed to travel to its destination. As the write has not completed until the write acknowledge signal is received no interrupt can be processed until this occurs which avoids coherency errors. Furthermore, as it is only the write acknowledge signal that is blocked and needs to be buffered, not much information needs to be stored thus there is little additional storage requirements. If it were the write transaction requests that were delayed considerably more storage would be required.

In some embodiments, the apparatus further comprises a master port for receiving transaction requests from said at least one further device to said memory; an interconnect port for accessing said memory via an interconnect; said apparatus comprising channels for transmitting said transaction requests to said interconnect port, at least some of said channels being routed through said monitoring circuitry to said interconnect port.

Although the monitoring circuit can monitor the write traffic in a number of ways, in some embodiments the channels being monitored are passed through the monitoring circuitry on their way to the interconnect and the monitoring circuitry can then monitor them and also block signals as required.

In some embodiments, said channels comprise a write address channel for transmitting an address of a write transaction request, a response channel for transmitting said write acknowledge signal, a write data channel for transmitting data to be written by said write transaction request, a read address channel for transmitting an address of a read transaction request and a read data channel for transmitting data that has been read, said response channel and said write address channel being routed through said monitoring circuitry to said interconnect port and said other channels being routed directly to said interconnect port.

In order for the monitoring circuitry to be able to monitor the write traffic from the at least one further device the write address channel is routed through the monitoring circuitry. This channel carries the information that the monitoring circuitry requires to determine if the write request is to a data item that is stored in the cache. The response channel is also routed through the monitoring circuitry enabling the monitoring circuitry to block the write acknowledge signal and then to transmit it once it has invalidated any local copies of the data that require invalidating. This is generally done by setting a valid indicator associated with the storage location to invalid.

In some embodiments, said monitoring circuitry is configured to monitor said write address channel to determine whether said write transaction request is to write a data item, a local copy of which is stored in said cache.

In some embodiments, said monitoring circuitry is responsive to a coherency indicator associated with a write transaction request having a predetermined value not to block said write acknowledge signal transmitted from said memory to said at least one further device, and being responsive to said coherency indicator not having said predetermined value to block said write acknowledge signal.

Although the monitoring circuitry can maintain coherency, there are circumstances where accesses are to regions where one can be sure that there are no coherency problems. In such a case, a coherency indicator has a predetermined value that indicates to the monitoring circuitry that coherency operations do not need to be performed for this access and thus, the write acknowledge signal does not need to be blocked and no line needs to be invalidated. Such a coherency indicator may be set to this predetermined value by the further device, and it may indicate that the device is writing to a region where local copies of the data are never taken.

In some embodiments, said coherency indicator comprises a sideband signal associated with an address of said write request.

Although the coherency indicator can be transmitted to the monitoring circuitry in a number of ways, it is quite convenient to transmit it as a sideband signal associated with an address to the write request. As the monitoring circuitry may use the write address to determine whether a local copy of the data item is stored in the cache, it will need to monitor this signal and as such, a sideband signal associated with it can also be monitored quite easily without requiring additional circuitry or routing.

In some embodiments, said cache comprises a write-through storage region, in which data is stored in said cache at a same time as it is stored in said memory and a write-back storage region in which data is stored first in said cache and marked as dirty and is stored in said memory later whereupon the local copy stored in said cache is no longer marked as dirty, said monitoring circuitry being responsive when trying to invalidate a stored local copy, to detection that said stored local copy is marked as dirty to assert an error indicator indicating failed invalidation and not to invalidate said storage location.

As noted in the introduction, caches can be configured to operate in either a write-through or a write-back mode. In a write-through mode the data is stored in the cache at the same time as it is stored in the memory while in a write-back mode it is stored in the cache first and stored in the memory later and thus, the cache may hold a value of the data item more recent than the value in memory. If it does hold this value it is marked as dirty. The coherency operations of the present invention are not suitable for write-back regions of the cache. This is because these coherency operations simply invalidate the local copy of the data item and if this is a dirty copy then it should be cleaned first, i.e. the value should be written to memory. However, it should be noted that if the access is to a write-back region of the cache where the data item stored is not dirty then the coherency operations will function correctly. Thus, embodiments of the present invention detect whether or not the item is marked as dirty and if it is they do not invalidate the stored local copy but rather they assert an error indicator which indicates a failed invalidation. In this way, the most up-to-date value of the data item is not overwritten and the processor knows from the error indicator that there is a programming error and it needs to react accordingly. Thus, although coherency is not maintained where there is a write-back region and a write request is made to memory where a dirty value of that item is stored in the cache, the system does provide an indication to the processor that an error has occurred and thus, the processor does not continue to operate with false data.

Although the error indicator can be flagged in a number of ways, in some embodiments said error indicator forms part of said write acknowledge response.

As the write acknowledge response is returned to the device that tried to access the memory which is storing an old version of the data, it is appropriate that the error response is sent to this device so that this device knows that coherency could not be maintained for this access. A convenient way of transmitting it is with the write acknowledge response, possibly as a side band signal to this response.

In some embodiments, said apparatus further comprises cache control circuitry for controlling storage of data items in said cache.

The cache may have associated with it cache control circuitry that controls the storage of the data and sets indicators such as the dirty bit.

In some embodiments, said monitoring circuitry is responsive to detection that said cache controller and said cache are powered down not to block said write acknowledge signal and not to invalidate said local copy.

If the cache controller and the cache are powered down then the monitoring circuitry is responsive to detection of this and does not block the write acknowledge signal nor does it invalidate the local copy. This is because if the cache is powered down then after it is powered up all the lines must be invalidated before it is enabled.

In some embodiments, said monitoring circuitry is configured in response to detection that said cache controller is powered down and said cache is powered up and in response to detecting a write transaction request to write a data item, a local copy of which is stored in said cache, to assert an error indicator indicating failed invalidation and not to invalidate said local copy.

If the cache controller is powered down but the cache itself is not powered down then in response to detecting a write transaction request to write a data item a local copy of which is stored in the cache, an error indicator is asserted and the local copy is not invalidated. If the cache controller is powered down then the cache data storage can no longer be correctly controlled and this can be signalled to any devices that are processing the data by an error signal. An error signal is also used to indicate times when the cache is operating in write-back mode and coherency cannot be maintained. Thus, the same indicator can be used for both situations and in this area efficient way times when the coherency of the stores cannot be guaranteed can be indicated to any processing apparatus.

A second aspect of the present invention provides a data processing apparatus comprising: said apparatus for storing data being processed according a first aspect of the present invention; a processor for processing said data; and an interconnect port associated with said processor for accessing said memory via an interconnect; wherein said cache is associated with and stores data processed by said processor.

Although the cache may be a stand alone cache that stores data for one or more devices such as video processors or various CPU's, in some embodiments it is a cache that is associated with a processor and stores data locally for that processor to use.

In some embodiments, said data processing apparatus comprises a further processor, a further cache associated with said further processor for storing a local copy of a data item stored in a memory and an interconnect port associated with said further processor for accessing said memory via an interconnect and monitoring circuitry associated with said further cache for monitoring write traffic on said interconnect; wherein said monitoring circuitry associated with each of said cache and said further cache is configured to monitor write transaction requests from a processor not associated with said respective cache and to respond to detecting a write transaction request to write a data item, a local copy of which is stored in said cache, to block a write acknowledge signal transmitted from said memory to said processor not associated with said cache indicating said write has completed and to invalidate said stored local copy in said cache and thereafter to send said acknowledge signal to said processor.

Embodiments of the present invention can provide a cross-coupled system where cache coherency between two cached processors is maintained in an area efficient manner by allowing the monitoring circuit of each to monitor the write requests of the other one and to invalidate cache lines where they are writing to data that is stored in respective caches.

In some embodiments, said data apparatus further comprises said at least one further device, said at least one further device comprising a direct memory access (DMA) device.

The at least one further device may comprise any device that accesses the memory, however in some embodiments it comprises a direct memory access device.

In some embodiments, said monitoring circuitry is responsive to a coherency indicator associated with a write transaction request having a predetermined value not to block said write acknowledge signal transmitted from said memory to said at least one further device, and being responsive to said coherency indicator not having said predetermined value to block said write acknowledge signal; and said direct memory access device is configured to set said coherency indicator as a sideband signal of write address data in said write transaction request in dependence upon whether an access is to be performed coherently or non-coherently.

The direct memory access device may perform data accesses such as copy operations coherently or non-coherently. If they are being performed non-coherently then it indicates this on a sideband signal of the write address data and the monitoring circuit then knows that it does not need to block the write acknowledge signal or invalidate any lines.

A third aspect of the present invention provides a method of maintaining coherency between a cache and a memory comprising: monitoring write transaction requests to said memory initiated by a device that does not store data in said cache; detecting one of said monitored write transaction requests that is to write a data item, a local copy of which may be stored in said cache; blocking a write acknowledge signal transmitted from said memory to said at least one further device indicating said detected write has completed; determining if said data item is stored in said cache and if so invalidating said stored local copy in said cache; unblocking said write acknowledge signal and transmitting said write acknowledge signal to said at least one further device.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
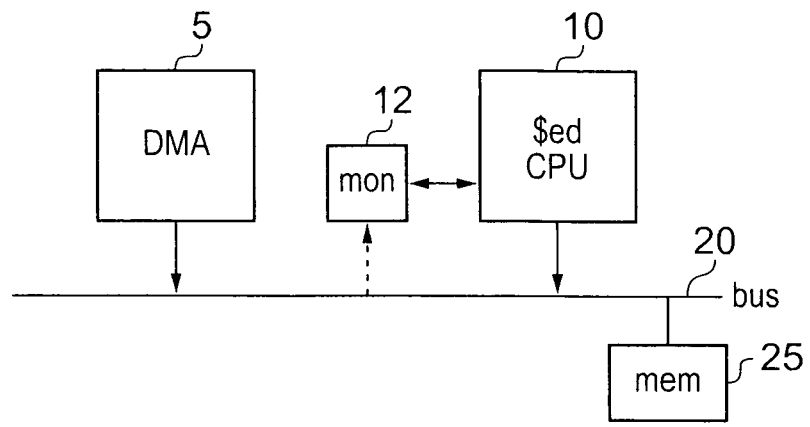
FIG. 1 shows a data processing apparatus with coherency maintenance system according to the prior art.
Figure 2:
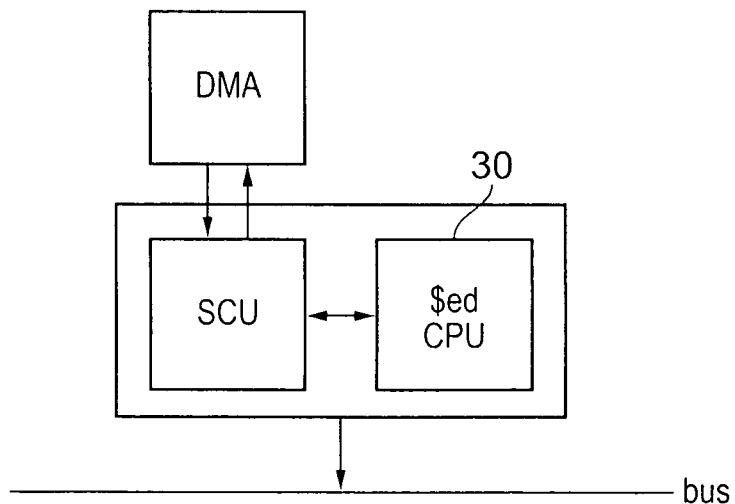
FIG. 2 shows a data processing apparatus with a different coherency maintenance system according to the prior art.
Figure 3:
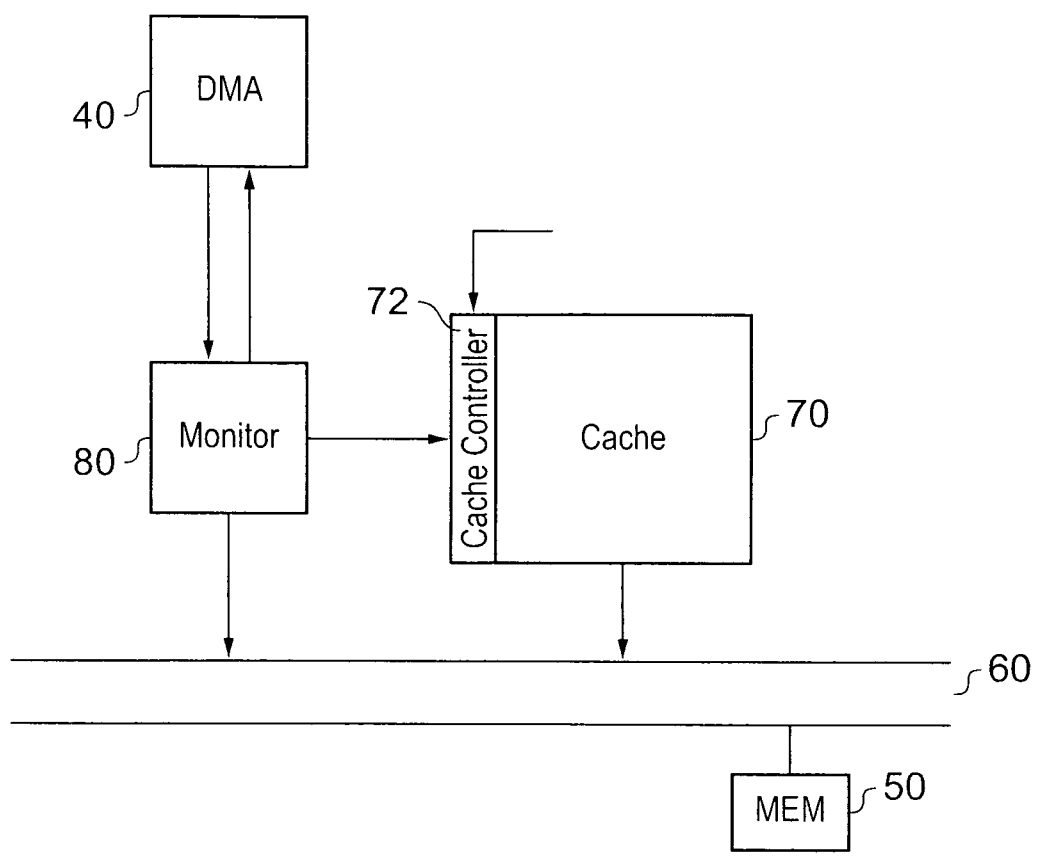
FIG. 3 schematically shows a system for accessing a memory, a stand alone cache and a coherency monitoring device according to an embodiment of the present invention.

FIG. 3 shows a device for maintaining coherency of data during data processing according to an embodiment of the present invention. In this apparatus there is a direct memory access controller DMA 40 that accesses a memory 50 via a bus 60. There is also a cache 70 with a cache controller 72 that is used by various devices not shown to store data.

The cache 70 holds local copies of data items that are also stored in the memory 50, enabling the devices that have access to this cache 70 to access these data items more quickly than would be the case if they had to access memory 50. As DMA 40 also accesses memory 50 there can be problems with coherency if DMA 40 were to write to a data item in memory 50 that has a local copy of it stored in cache 70. In order to avoid this happening, monitoring circuitry 80 monitors the write requests from the DMA 40 to the memory 50. If it detects a write request to a data item that is also stored in cache 70 it sends a signal to cache controller 72 to invalidate the cache line storing the data item and it blocks the write acknowledge signal sent back from memory 50 to DMA 40 indicating that the write request has completed until it receives a signal from the cache controller 72 indicating that the line has been invalidated. At this point it forwards the write acknowledge signal to the DMA 40.

This ensures that the write does not complete before the cache line is invalidated and thus, any interrupts generated as a result of the DMA 40 write completing and received by any of the various devices using cache 70 through cache controller 72 will not be processed until the cache coherency operations have been performed and data in cache 70 has been made coherent with data in system memory 50.

Figure 4:
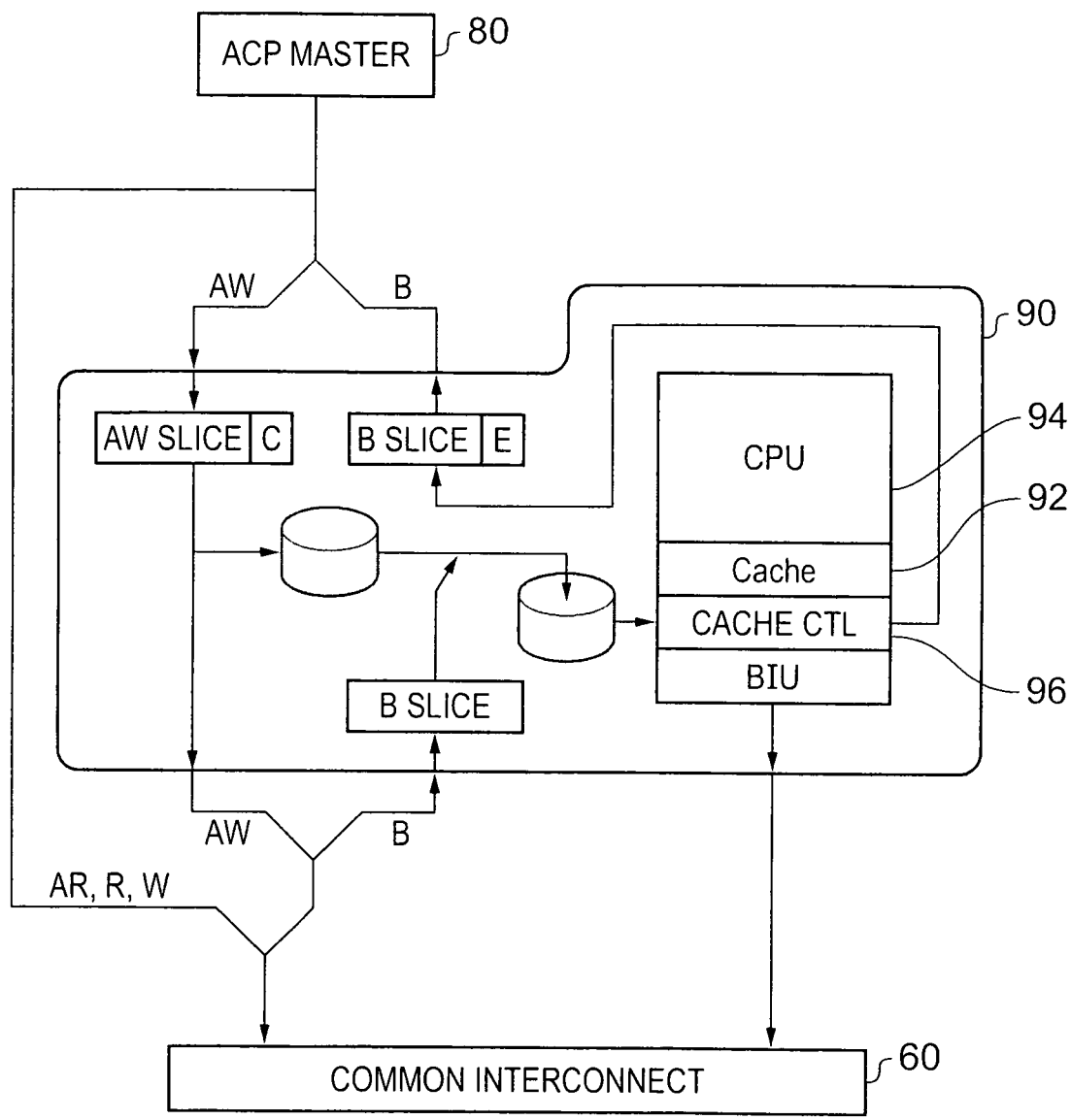
FIG. 4 shows a processing device with a coherency maintenance system according to an embodiment of the present invention.

FIG. 4 shows an alternative embodiment of the present invention in which an external master 80 such as the DMA 40 of FIG. 3 will access the common interconnect 60 that provides access to the memory via a master port, causing the transactions from the external master 80 to be routed to the bus 60 via monitoring circuitry which is enclosed within processing apparatus 90. The channels for carrying the transaction request from the master are separated so that the read address, the read data and the write data channels are routed directly to the bus 60 while the channels for carrying the write address and the write acknowledge signal are routed via monitoring circuitry within processing device 90. The monitoring circuitry snoops the write address channel for issued write transactions that are writing to address locations that are addresses of data items that are also stored within cache 92 of the CPU 94. If the monitoring circuitry detects from the write address that a write transaction is being sent to a data item that has a local copy in cache 92 then it blocks the write acknowledge signal when it appears on the response channel B and instructs cache control circuitry 96 to invalidate the line holding this data item. On completion of the invalidation the write acknowledge signal is sent further along the channel and out via the master port to external master 80.

In this embodiment, in addition to transmitting the write address information, write address channel AW transmits further coherency information C. This information is added to the write address information as a side band signal by the external master in dependence upon whether or not the operations that it is requesting should be performed coherently or non-coherently. If the C indicator indicates that these operations are to be performed non-coherently then the control logic recognises that the coherency operations do not need to be performed and thus, the write acknowledge signal sent on response channel B is transmitted directly to the external master 80 via the master port and is not blocked and no cache lines are invalidated.

In some embodiments, the cache 92 may have regions that are configured as write-through regions and regions that are configured as write-back regions. Write-through regions are regions in the cache where data that is written to the cache is written at the same time to the memory. Write-back regions are regions where data that is written to the cache is not immediately written to the memory but is written to the memory later. With write-back systems the cache may store more recent values of a data item than the memory. Where this is the case, the data item stored in the cache is marked as being "dirty". The coherency operations that are performed when the external master 80 writes to the memory through processing device 90 can maintain coherency for the write-through regions of the cache but cannot always maintain coherency for the write-back regions. However, the monitoring circuitry is configured to indicate where this is the case so that the system knows that a software programming error has occurred.

In order to be able to deal with write-back regions in the cache as well as write-through regions the monitoring logic within processing device 90 determines using cache control circuitry 96 whether the line that is to be invalidated is marked as dirty or not. If it is marked as dirty then it knows that not only it is in a write-back region but it holds a version of the data item more recent than that in the memory. In response to detecting this dirty indication the monitoring circuitry does not invalidate the line holding the value but rather sets an error bit E on the write acknowledge signal so that when the master receives the write acknowledge signal it knows that there is a programming error associated with the write as the most recent version of the data was not stored in the memory. By not invalidating the line then the most recent version of the data is still stored in the cache. Furthermore, by operating in this manner, where the write-back regions of the cache do not hold more recent data than the memory then no coherency problems will arise and no error need be indicated. Thus, it is only where this region of the cache is accessed while dirty values are being stored that errors will arise.

It should be noted that this error signalling is not guaranteed to highlight every case. For example, if the dirty data is evicted from the cache before the monitoring logic looks at that entry but after the write from the external master has been performed then the cache will not indicate an error while in fact memory coherency has been lost.

This error signalling can also be used in circumstances where the processor and the cache control circuitry 96 are powered down but the cache is powered up. In such a case, the cache cannot be correctly controlled, hence if the monitoring circuitry that is snooping writes from the external master determines that the cache could be holding a copy of the data that is being written, it asserts an error indicator indicating failed invalidation and does not invalidate the cache line storing the local copy.

In other circumstances where the monitoring circuitry detects that both the cache and the cache control circuitry are powered down then the monitoring circuitry does not block the write acknowledge signal and nor does it set the error bit, it simply forwards the write acknowledge signal. This is because if the cache is powered down its contents are lost and after it is powered up all of the lines must be invalidated before the cache is enabled, and there is no need to invalidate them individually as writes are performed.

Figure 5:
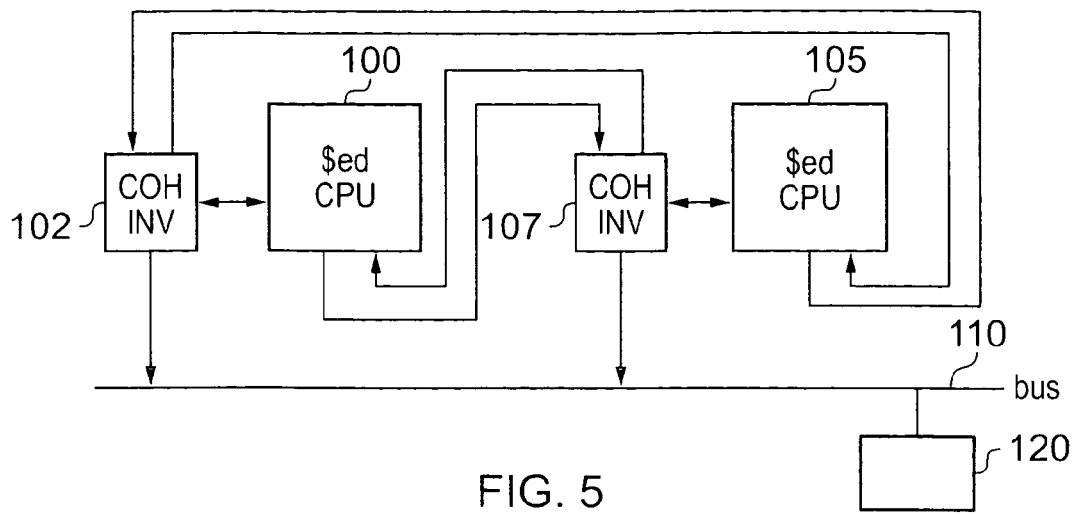
FIG. 5 shows a system allowing cache coherency in a cross coupled system.

FIG. 5 shows a cross-coupled processing system according to an embodiment of the present invention. In this embodiment, processor 100 and its associated cache have monitoring circuit 102 associated with them for monitoring write transactions on bus 110 performed by processor 105 that also has an associated cache. Processor 105 has monitoring circuitry 107 for monitoring transactions on bus 110 performed by processor 100. Transactions from processor 100 to memory 120 are sent via the coherency monitoring circuitry 107 to bus 110. Coherency circuitry 107 monitors these transactions to determine write transactions to data items that may be stored in the local cache of processing device 105. Where it detects these accesses it blocks the write acknowledge signal until it has determined if the data item is stored in the cache and if it is has invalidated the entry that stores this value. Similarly, transaction requests from processor 105 are routed via monitoring circuitry 102 and write transactions to data items that may be stored in the local cache of processing device 100 have their write acknowledge blocked by coherency monitoring circuitry 102 until the appropriate entry in the cache associated with processing device 100 has been invalidated.

In this way, the two processors are cross-coupled and cache-to-cache coherency is maintained in a very area efficient manner.

In some embodiments, the caches associated with the two processing devices 100 and 105 may have write-back regions as well as write-through regions. In such cases, the coherency monitoring circuitry 102 and 107 will generate error side band signals on the write acknowledge signal when they detect that the line that they were to invalidate stores data that is marked as dirty in the cache; they will also not invalidate the line.

Figure 6:
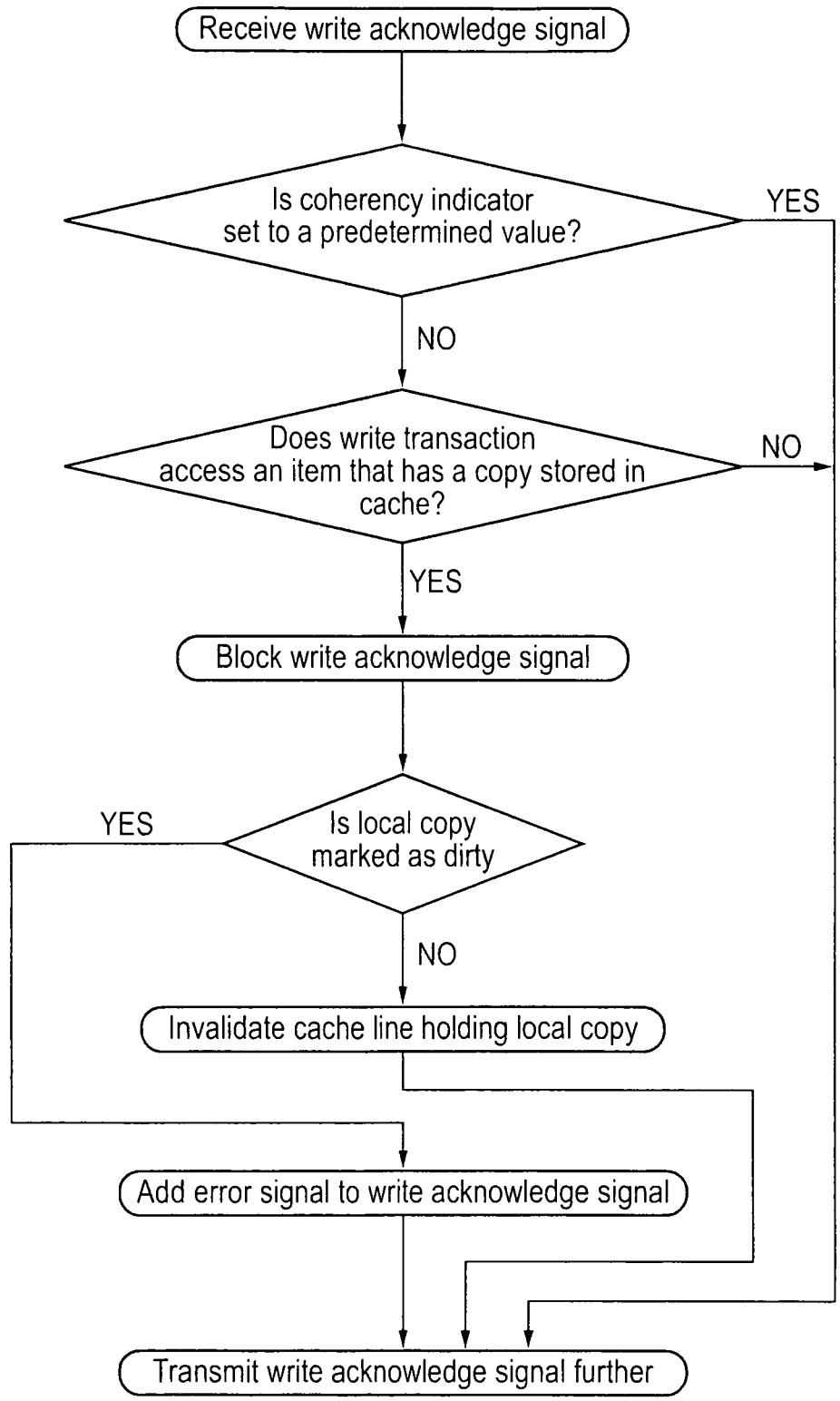
FIG. 6 shows a flow diagram illustrating steps in a method for maintaining the coherency of a cache according to an embodiment of the present invention.

FIG. 6 shows a flow diagram illustrating a method of maintaining coherency according to an embodiment of the present invention. A write acknowledge signal is received from a write transaction request at monitoring circuitry. It is then determined if the write transaction pertaining to this acknowledge signal has a coherency indicator associated with it that is set to a predetermined value. A coherency indicator can be set to a predetermined value to indicate to the monitoring circuitry that coherency operations do not need to be performed for this access and thus, the write acknowledge signal does not need to be blocked and no line needs to be invalidated. Thus, if it has the predetermined value then the access is a non-coherent access and the write acknowledge signal is transmitted further. If it is does not have the predetermined value then the write acknowledge signal is blocked. It is then determined if the access is to an item that has a copy stored in the cache. If it is not then the write acknowledge signal is transmitted further. If it is then it is determined if the local copy is marked as dirty. If it is not marked as dirty then the cache line holding the local copy is invalidated and then the write acknowledge signal is transmitted further. If the cache copy is marked as dirty then an error signal is added to the write acknowledge signal and the write acknowledge signal is transmitted further and the cache line is not invalidated.

The error signal signals to the external master that receives it that there is a programming error.

Figure 7:
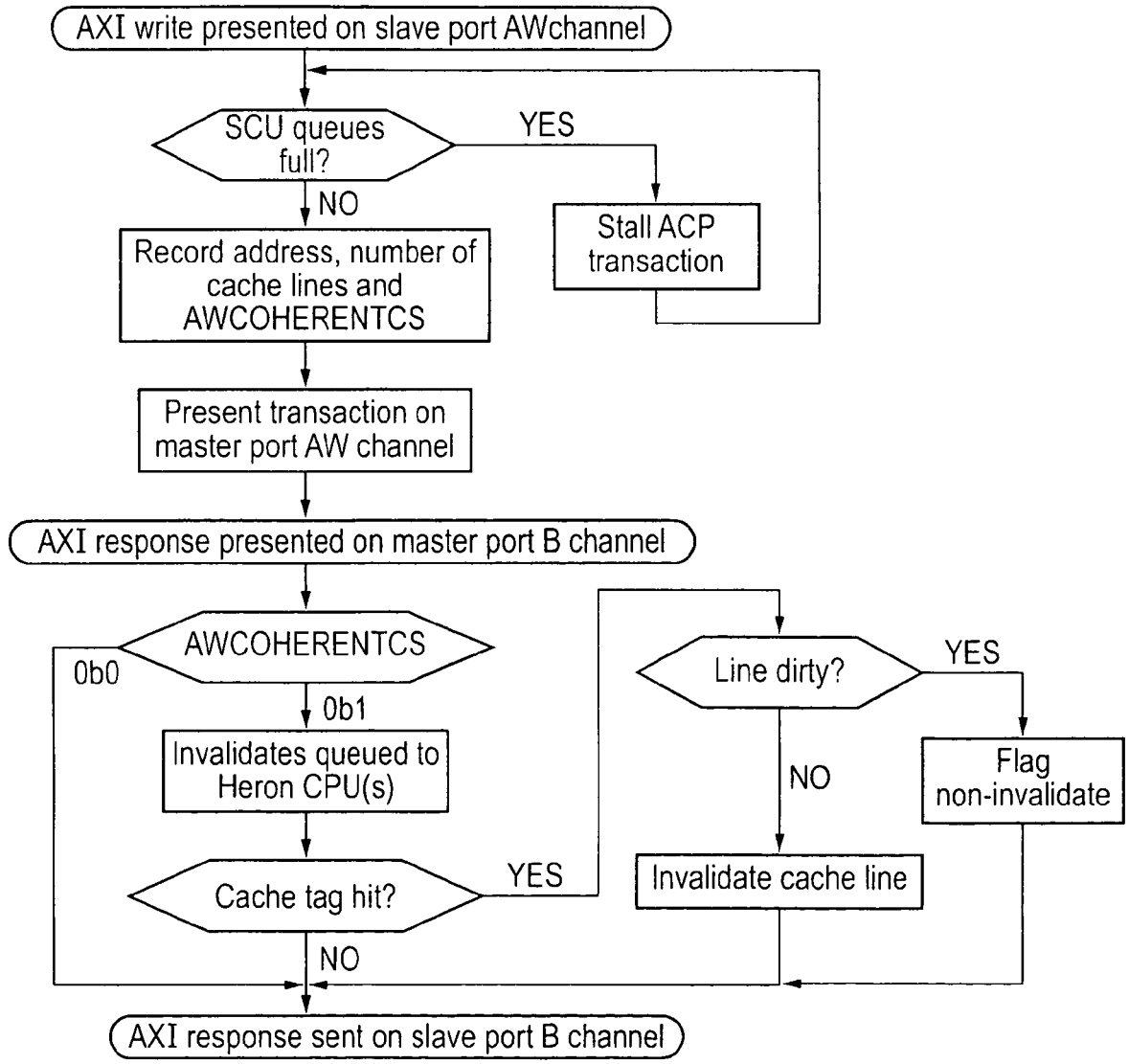
FIG. 7 shows a flow diagram illustrating steps in a method for maintaining the coherency of the processing device of FIG. 4.

FIG. 7 shows a similar flow diagram for an embodiment of the invention executed on the apparatus according to FIG. 4. This relates to an AXI protocol which is a protocol used by ARM® of Cambridge, United Kingdom. Thus, an AXI write is presented on the slave port of the snoop control unit SCU and it is determined if the SCU queues are full. If they are then the transaction request is stalled; if they are not then the address, number of cache lines and coherent indicator for this write are recorded and the transaction is presented on the ACP master port. The request is then transmitted further to the common interconnect 60 and when the response is presented on the master port B channel it is recalled if the coherent indicator AWCOHERENTCS was set at 0 or 1. If it was set at 0 then this indicates that coherency does not need to be maintained and the response signal is sent on to the slave port. If it is set to 1 then coherency does need to be maintained and a coherency operation is queued to the cache control circuitry 96 of the CPU 94. For each line the cache control circuitry 96 performs a cache lookup and if there is a cache tag hit then it is determined if the line is dirty. If it is not dirty then the line is invalidated and the AXI response is sent further. If it is dirty then the line is not invalidated and an error signal is appended to the response (see for example the E signal appended to the B slice of FIG. 4) and this is then sent further. If there is no cache tag hit then the cache is not accessed and the response signal is sent further.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. An apparatus for storing data being processed, said apparatus comprising:
a cache, associated with at least one device, configured to store a local copy of data items stored in a memory for use by said at least one device; and
monitoring circuitry, associated with said cache, configured to monitor write transaction requests to said memory wherein said write transaction requests are initiated by at least one further device, said at least one further device is configured to not store data in said cache, said monitoring circuitry is configured, upon detecting one of said write transaction requests to write a data item stored locally in said cache, to block a write acknowledge signal transmitted from said memory to said at least one further device indicating said data item write has completed and to invalidate said stored local copy in said cache and on completion of said invalidation, to send said write acknowledge signal to said at least one further device.

2. An apparatus according to claim 1, further comprising:
a master port configured to receive said write transaction requests from said at least one further device to said memory;
an interconnect port for accessing said memory via an interconnect;
said apparatus comprising channels for transmitting said write transaction requests to said interconnect port, at least some of said channels being routed through said monitoring circuitry to said interconnect port.

3. An apparatus according to claim 2, wherein said channels comprise a write address channel for transmitting addresses of said write transaction requests, a response channel for transmitting said write acknowledge signal, a write data channel for transmitting data to be written by said write transaction request, a read address channel for transmitting an address of a read transaction request and a read data channel for transmitting data that has been read, said response channel and said write address channel being routed through said monitoring circuitry to said interconnect port and said other channels being routed directly to said interconnect port.

4. An apparatus according to claim 1, said monitoring circuitry being configured to monitor said write address channel to determine whether said one of said write transaction requests is to write said data item stored locally in said cache.

5. An apparatus according to claim 1, said monitoring circuitry being responsive to a coherency indicator associated with said one of said write transaction requests having a predetermined value to not block said write acknowledge signal transmitted from said memory to said at least one further device, and being responsive to said coherency indicator not having said predetermined value to block said write acknowledge signal.

6. An apparatus according to claim 5, said coherency indicator comprises a sideband signal associated with an address of said one of said write transaction requests.

7. An apparatus according to claim 1, wherein said cache comprises a write-through storage region, in which data is stored in said cache at a same time as it is stored in said memory and a write-back storage region in which data is stored first in said cache and marked as dirty and is stored in said memory later whereupon said local copy stored in said cache is no longer marked as dirty, said monitoring circuitry being responsive when trying to invalidate a stored local copy, to detection that said stored local copy is marked as dirty to assert an error indicator indicating failed invalidation and not to invalidate said storage location.

8. An apparatus according to claim 1, wherein said error indicator forms part of said write acknowledge response.

9. An apparatus according to claim 1, further comprising cache control circuitry for controlling storage of said data items in said cache.

10. An apparatus according to claim 9, wherein said monitoring circuitry is responsive to detection that said cache controller and said cache are powered down not to block said write acknowledge signal and not to invalidate said local copy.

11. An apparatus according to claim 9, wherein said monitoring circuitry is configured in response to detection that said cache controller is powered down and said cache is powered up and, in response to detecting said one of said write transaction requests to write a data item, to assert an error indicator indicating failed invalidation and not to invalidate said local copy.

12. A data processing apparatus comprising:
said apparatus for storing data being processed according to claim 1;
a processor for processing said data; and
an interconnect port associated with said processor for accessing said memory via an interconnect; wherein said cache is associated with and stores data processed by said processor.

13. A data processing apparatus according to claim 12, said data processing apparatus comprising a further processor, a further cache associated with said further processor configured to store a local copy of said data items stored in said memory and an interconnect port associated with said further processor for accessing said memory via said interconnect and said monitoring circuitry associated with said further cache for monitoring write traffic on said interconnect; wherein said monitoring circuitry associated with each of said cache and said further cache is configured to monitor write transaction requests from a processor not associated with said respective cache and to respond to detecting a write transaction request to write a data item, a local copy of which is stored in said cache, to block a write acknowledge signal transmitted from said memory to said processor not associated with said cache indicating said write has completed and to invalidate said stored local copy in said cache and thereafter to send said write acknowledge signal to said processor.

14. A data processing apparatus according to claim 12, said data processing apparatus further comprising said at least one further device, said at least one further device comprising a direct memory access (DMA) device.

15. A data processing apparatus according to claim 14, wherein said monitoring circuitry is responsive to a coherency indicator associated with one of said write transaction requests having a predetermined value not to block said write acknowledge signal transmitted from said memory to said at least one further device, and being responsive to said coherency indicator not having said predetermined value to block said write acknowledge signal; and said direct memory access device is configured to set said coherency indicator as a sideband signal of write address data in said write transaction request in dependence upon whether an access is to be performed coherently or non-coherently.

16. A method of maintaining coherency between a cache and a memory, said method comprising the steps of:

monitoring write transaction requests to said memory wherein said write transaction requests are initiated by a device that does not store data in said cache;

detecting one of said monitored write transaction requests that is to write a data item;

blocking a write acknowledge signal transmitted from said memory to said device indicating said detected write transaction request has completed;

determining if there is a local copy of said data item stored in said cache and, if so, invalidating said stored local copy in said cache;

unblocking said write acknowledge signal and transmitting said write acknowledge signal to said device.

17. A method according to claim 16, wherein said step of monitoring said write transaction requests comprises monitoring a write address of said write transaction requests to determine whether said write transaction request is to write a data item that is stored locally in said cache.

18. A method according to claim 16, comprising a further step of monitoring a coherency indicator associated with said write transaction requests and in response to said coherency indicator having a predetermined value not performing said steps of blocking and invalidating and only performing said steps of blocking and invalidating for write transaction requests where said coherency indicator does not have said predetermined value.

19. A method according to claim 16, said method comprising a further step of prior to performing said step of invalidating, detecting whether said stored local copy is marked as dirty and if it is asserting an error indicator indicating failed invalidation and not performing said invalidating step and if it is not performing said invalidating step.

20. A method according to claim 16, said method comprising a further step of determining if a cache controller and said cache are powered down and if they are, not performing said blocking or said invalidating steps until detection of said cache and said cache controller being powered up again.

21. A method according to claim 16, said method comprising the steps of:

determining if a cache controller is powered down and said cache is powered up and, if they are, asserting, in response to detecting a write transaction request to write a data item that is stored locally in said cache, an error indicator indicating failed invalidation and not invalidating said local copy.

22. An apparatus for storing data being processed comprising:

a cache associated with at least one device and for storing a local copy of data items stored in a memory for use by said at least one device;

monitoring circuitry associated with said cache for monitoring write transaction requests to said memory initiated by at least one further device, said at least one further device being configured to not store data in said cache, said monitoring circuitry being responsive to detecting a write transaction request to write a data item, a local copy of which is stored in said cache, to block a write acknowledge signal transmitted from said memory to said at least one further device indicating said write has completed and to invalidate said stored local copy in said cache and on completion of said invalidation to send said write acknowledge signal to said at least one further device; and cache control circuitry for controlling storage of data items in said cache, wherein said monitoring circuitry is responsive to detection that said cache controller and said cache are powered down not to block said write acknowledge signal and not to invalidate said local copy.

* * * * *